(12) United States Patent
Gallagher

(10) Patent No.: US 10,560,862 B1
(45) Date of Patent: Feb. 11, 2020

(54) INTERFERENCE-AWARE APPLICATIONS FOR CONNECTED VEHICLES

(71) Applicants: DENSO International America, Inc., Southfield, MI (US); DENSO CORPORATION, Kariya-shi, Aichi-ken (JP)

(72) Inventor: Brian C. Gallagher, Carlsbad, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/038,578

(22) Filed: Jul. 18, 2018

(51) Int. Cl.
| | | |
|---|---|---|
| *H04W 24/10* | (2009.01) | |
| *H04W 4/40* | (2018.01) | |
| *H04W 4/021* | (2018.01) | |
| *G07C 5/00* | (2006.01) | |
| *G01C 21/34* | (2006.01) | |
| *H04B 17/345* | (2015.01) | |
| *G06F 16/29* | (2019.01) | |

(52) U.S. Cl.
CPC ........ *H04W 24/10* (2013.01); *G01C 21/3415* (2013.01); *G06F 16/29* (2019.01); *G07C 5/008* (2013.01); *H04B 17/345* (2015.01); *H04W 4/021* (2013.01); *H04W 4/40* (2018.02)

(58) Field of Classification Search
CPC .................................................... H04W 24/10
USPC ......................................................... 370/252
See application file for complete search history.

(56) References Cited

U.S. PATENT DOCUMENTS

| | | | | |
|---|---|---|---|---|
| 10,117,257 B1* | 10/2018 | Naim | ..................... | H04L 5/0037 |
| 2008/0065401 A1* | 3/2008 | Abrahamson | ........ | G06Q 30/018 |
| | | | | 705/317 |
| 2012/0287749 A1* | 11/2012 | Kutlik | ..................... | G01H 3/125 |
| | | | | 367/7 |
| 2014/0269364 A1* | 9/2014 | Knapp | ................... | H04W 24/02 |
| | | | | 370/252 |
| 2014/0269850 A1* | 9/2014 | Abdelmonem | ........ | H04L 5/0026 |
| | | | | 375/148 |
| 2015/0346314 A1* | 12/2015 | Underbrink | ............... | G01S 3/80 |
| | | | | 367/129 |
| 2016/0183268 A1* | 6/2016 | Albano | ............... | H04L 12/2801 |
| | | | | 370/252 |
| 2017/0208560 A1* | 7/2017 | Papa | ................... | H04W 56/006 |

(Continued)

*Primary Examiner* — Peter G Solinsky
(74) *Attorney, Agent, or Firm* — Harness, Dickey & Pierce, P.L.C.

(57) ABSTRACT

Methods and systems are disclosed and include receiving a first reporting signal from a vehicle-to-everything communication system. The first reporting signal includes data indicating (i) a noise measurement of a communication channel and (ii) a location associated with the noise measurement. The method includes determining the location is associated with a noisy region in response to a value of the noise measurement exceeding a first threshold value. The method includes generating an entry based on the first reporting signal in response to the value of the noise measurement exceeding the first threshold value. The method includes storing the entry in a database that includes a plurality of additional entries. The method includes generating an alert based on at least one of the entry and the plurality of additional entries. The alert is configured to indicate a presence of noise at a location associated with one of the entries.

19 Claims, 12 Drawing Sheets

(56) References Cited

U.S. PATENT DOCUMENTS

| | | | |
|---|---|---|---|
| 2017/0242132 A1* | 8/2017 | Kim | G01S 17/023 |
| 2017/0280344 A1* | 9/2017 | Siomina | H04W 24/10 |
| 2019/0088125 A1* | 3/2019 | Park | H04W 4/40 |
| 2019/0106021 A1* | 4/2019 | Dietrich | B60N 2/0292 |
| 2019/0155632 A1* | 5/2019 | Toy | G06F 9/45558 |
| 2019/0215821 A1* | 7/2019 | Dillon | H04W 72/048 |

* cited by examiner

FIG. 3B

| Example Assessment of Channel Noise | CH 172 | CH 174 | CH 176 | CH 178 | CH 180 | CH 182 | CH 184 |
|---|---|---|---|---|---|---|---|
| Low Noise: all communication channels clear in this geographic region | | | | | | | |
| High Noise: three communication channels in this geographic region are noisy, four are not | | | ■ | ■ | ■ | | |
| High Noise: two communication channels in this geographic region are noisy; five are not | | | | | | ■ | ■ |

85

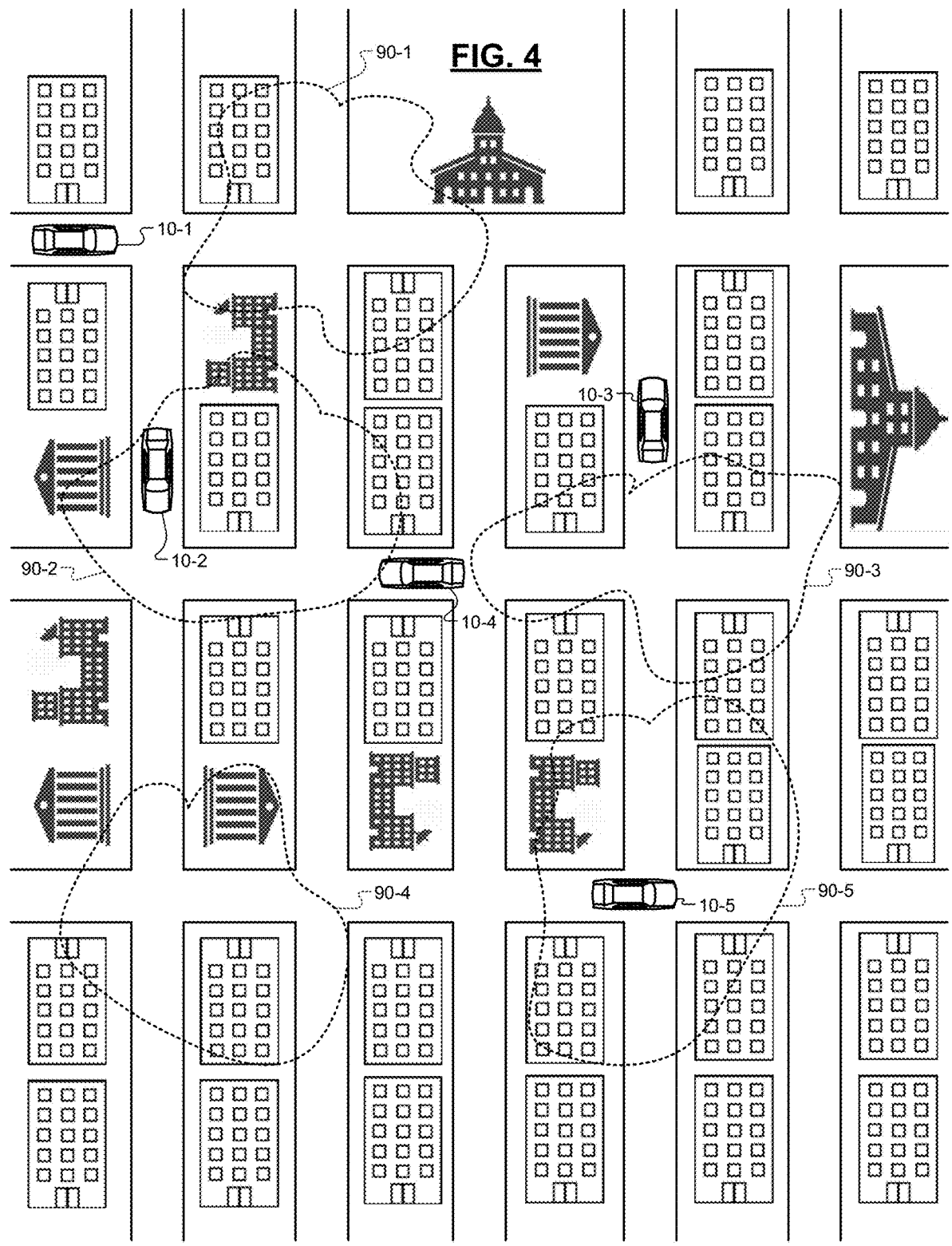

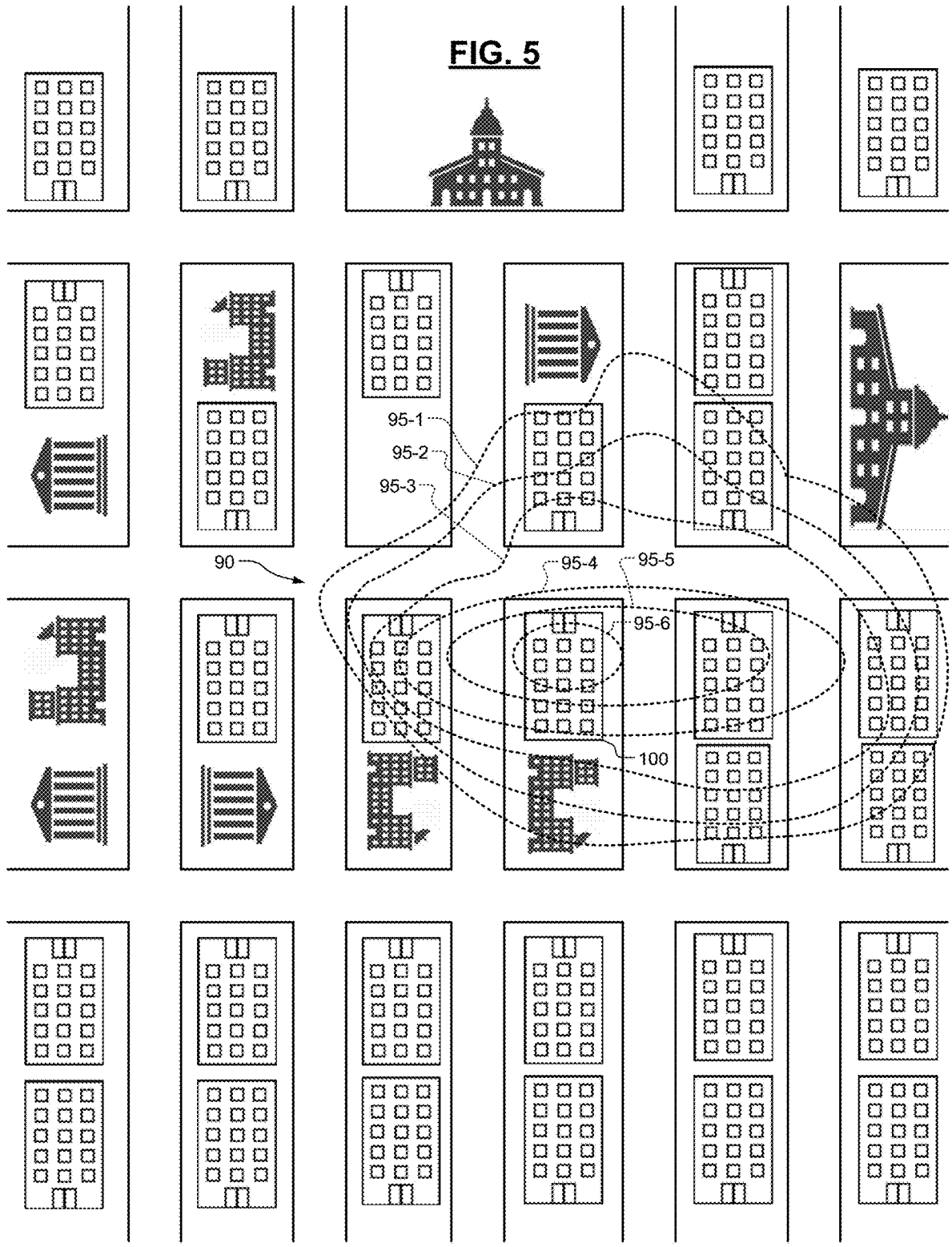

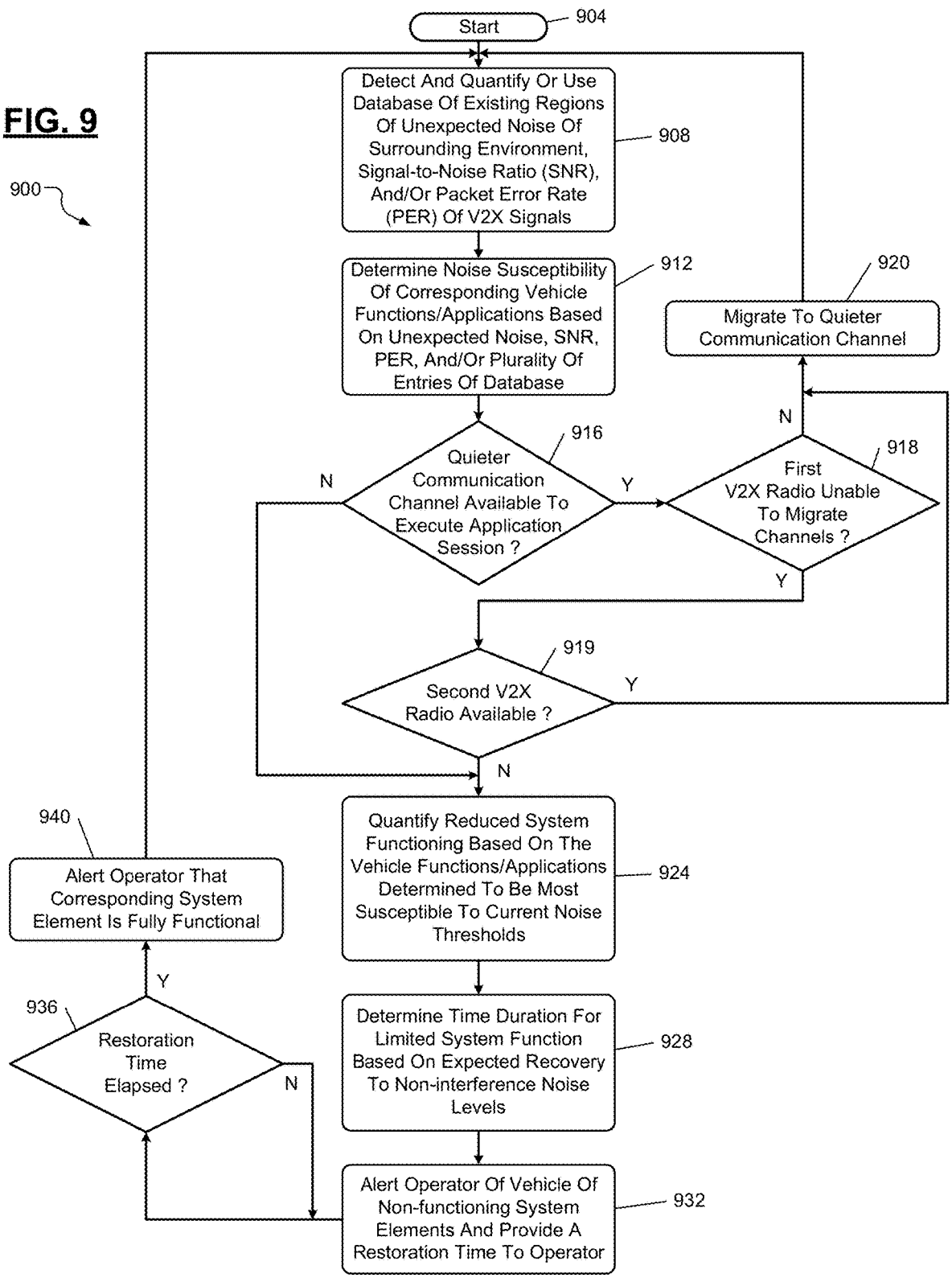

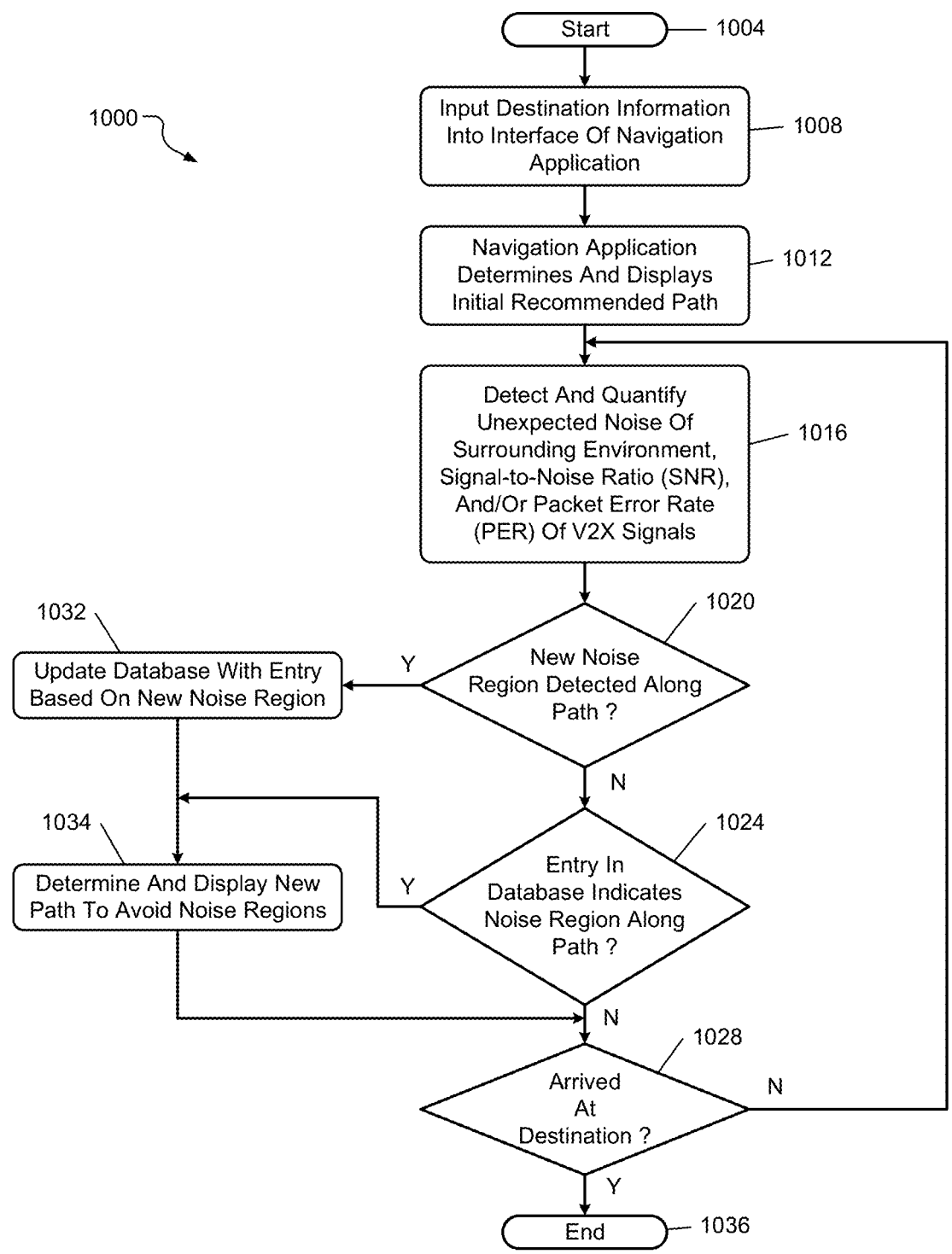

INTERFERENCE-AWARE APPLICATIONS FOR CONNECTED VEHICLES

FIELD

The present disclosure relates to short-range inter-vehicle wireless communications and, more particularly, detecting and exploiting undesired external noise on short-range inter-vehicle wireless communication links.

BACKGROUND

This section provides background information related to the present disclosure and is not necessarily prior art.

Connected vehicles and autonomous vehicles may execute vehicle-to-vehicle (V2V), vehicle-to-infrastructure (V2I), vehicle-to-pedestrian (V2P), and vehicle-to-bicyclist (V2B) communication, which may be collectively referred to as vehicle-to-everything (V2X) communication. These V2X communications can use, for example, a dedicated short-range communications (DSRC) system or a cellular-based communications system. The V2V and V2I systems operate on short-range wireless communication channels designed for automotive use. As an example, V2V and V2I communications take place on a radio signal in the 5.9 GHz band, with the V2V and V2I systems transmitting and receiving radio signals in a 75 MHz band around 5.9 GHz. Further, the 5.9 GHz band is divided into 7 communication channels.

V2V and V2I communication systems enable the execution of various connected vehicle and autonomous vehicle applications, such as imminent crash safety, autonomous vehicle sensor sharing, and real-time platoon control. These communications are safety-critical, always active, and must operate in extreme weather conditions and with short time delays.

Because the frequency spectrum of V2V and V2I communication systems is limited, it may be shared among other licensed and unlicensed wireless operators, and interference with the vehicle communication links is likely in some localized areas. The link degradation resulting from the interference may result in complete nonoperation of the V2X communication link, which may subsequently result in inaccurate transmission and/or reception of critical messages and vehicle collisions. As such, there is a need to detect and exploit noise from external sources that affect the communication link. Such noise may be localized in time, space, channel, and power level.

SUMMARY

This section provides a general summary of the disclosure, and is not a comprehensive disclosure of its full scope or all of its features.

A method is disclosed and includes receiving, using at least one processor that is configured to execute instructions stored in a nontransitory computer-readable medium, a first reporting signal from a vehicle-to-everything (V2X) communication system, wherein the first reporting signal includes data indicating (i) a noise measurement of a communication channel, and (ii) a location associated with the noise measurement. The method includes determining, using the at least one processor, the location is associated with a noisy region in response to a value of the noise measurement exceeding a first threshold value. The method includes generating, using the at least one processor, an entry based on the first reporting signal in response to the value of the noise measurement exceeding the first threshold value. The method includes storing, using the at least one processor, the entry in a database, wherein the database includes a plurality of additional entries, and wherein each of the plurality of additional entries includes information based on a plurality of additional reporting signals. The method includes generating, using the at least one processor, an alert based on at least one of the entry and the plurality of additional entries, wherein the alert is configured to indicate a presence of noise at a location associated with the at least one of the entry and the plurality of additional entries.

In other embodiments, the method further comprises transmitting, using the at least one processor, a signal to the V2X communication system, wherein the signal is configured to cause a control module of a vehicle associated with the V2X communication system to indicate to an operator that at least one vehicle function of the vehicle is impaired.

In other embodiments, the signal is configured to cause the control module to generate a restoration time of the at least one vehicle function of the vehicle.

In other embodiments, the method further comprises transmitting, using the at least one processor, a signal to at least one the V2X communication system of a vehicle and a mobile device, wherein the signal is configured to cause at least one of a control module of the vehicle and the mobile device to update a navigation application.

In other embodiments, updating the navigation application further comprises identifying a recommended path generated by the navigation application. Updating the navigation application further comprises determining whether the recommended path is associated with at least one of the plurality of additional entries. Updating the navigation application further comprises generating a new path in response to the recommended path being associated with at least one of the plurality of additional entries. Updating the navigation application further comprises displaying the new path on an interface of the navigation application in response to generating the new path.

In other embodiments, updating the navigation application further comprises identifying a recommended path generated by the navigation application. Updating the navigation application further comprises determining whether the recommended path is associated with the entry. Updating the navigation application further comprises generating a new path in response to the recommended path being associated with the entry. Updating the navigation application further comprises displaying the new path on an interface of the navigation application in response to generating the new path.

In other embodiments, the method further comprises transmitting a critical report to an entity in response the value of the noise measurement of the communication channel of the first reporting signal exceeding a critical threshold value.

In other embodiments, the method further comprises generating, using the at least one processor, a plurality of noise contours based on at least one of the entry and a set of the plurality of additional entries. The method further comprises identifying, using the at least one processor, a physical location for the source of noise based on the plurality of noise contours.

A system is also disclosed and includes at least one processor that is configured to execute instructions stored in a nontransitory computer-readable medium. The instructions include receiving a first reporting signal from a vehicle-to-everything (V2X) communication system, wherein the first reporting signal includes data indicating (i) a noise measurement of a communication channel, and (ii) a location associated with the noise measurement. The instructions include determining the location is associated with a noisy region in response to a value of the noise measurement exceeding a first threshold value. The instructions include generating an entry based on the first reporting signal in response to the value of the noise measurement exceeding the first threshold value. The instructions include storing the entry in a database, wherein the database includes a plurality of additional entries, and wherein each of the plurality of additional entries includes information based on a plurality of additional reporting signals. The instructions include generating an alert based on at least one of the entry and the plurality of additional entries, wherein the alert is configured to indicate a presence of noise at a location associated with the at least one of the entry and the plurality of additional entries.

In other embodiments, the instructions further comprise transmitting a signal to the V2X communication system, wherein the signal is configured to cause a control module of a vehicle associated with the V2X communication system to indicate to an operator that at least one vehicle function of the vehicle is impaired.

In other embodiments, the signal is configured to cause the control module to generate a restoration time of the at least one vehicle function of the vehicle.

In other embodiments, the instructions further comprise transmitting a signal to at least one the V2X communication system of a vehicle and a mobile device, wherein the signal is configured to cause at least one of a control module of the vehicle and the mobile device to update a navigation application.

In other embodiments, updating the navigation application further comprises updating the navigation application further comprises identifying a recommended path generated by the navigation application. Updating the navigation application further comprises determining whether the recommended path is associated with at least one of the plurality of additional entries. Updating the navigation application further comprises generating a new path in response to the recommended path being associated with at least one of the plurality of additional entries. Updating the navigation application further comprises displaying the new path on an interface of the navigation application in response to generating the new path.

In other embodiments, updating the navigation application further comprises identifying a recommended path generated by the navigation application. Updating the navigation application further comprises determining whether the recommended path is associated with the entry. Updating the navigation application further comprises generating a new path in response to the recommended path being associated with the entry. Updating the navigation application further comprises displaying the new path on an interface of the navigation application in response to generating the new path.

In other embodiments, the instructions further comprise transmitting a critical report to an entity in response the value of the noise measurement of the communication channel of the first reporting signal exceeding a critical threshold value.

In other embodiments, the instructions further comprise generating a plurality of noise contours based on at least one of the entry and a set of the plurality of additional entries.

The instructions also comprise identifying a physical location for the source of noise based on the plurality of noise contours.

Another method is disclosed and includes determining, using at least one processor that is configured to execute instructions stored in a nontransitory computer-readable medium, a first noise metric of a first signal received by a first vehicle-to-everything (V2X) communication system of a first vehicle. The first signal is associated with a first location, and the first signal is received using a first communication channel. The method also includes determining, using the at least one processor, whether the first noise metric exceeds a threshold value and receiving, using the at least one processor, information corresponding to a second noise metric of a second signal received by a second V2X communication system of a second vehicle. The second signal is associated with the first location, and the second signal is received using the first communication channel. The method also includes selecting, using the at least one processor, a second communication channel in response to (i) the first noise metric exceeding the threshold value and (ii) the second noise metric exceeding the threshold value. The method also includes instructing, using the at least one processor, the first V2X communication system to establish a communication link with the second V2X communication system via the second communication channel in response to selecting the second communication channel.

In other embodiments, the noise metrics of additional signals received using the second communication channel are less than the threshold value.

In other embodiments, the first noise metric and the second noise metric are based on at least one of a received signal strength, a raw noise measurement, a signal-to-noise ratio, and/or a packet error rate.

In other embodiments, the method further comprises scanning each channel of the V2X system and obtaining a corresponding noise metric for each channel as a background operation. In other embodiments, the method further comprises transmitting the corresponding noise metric for each channel to a second vehicle that is not configured to (i) scan each channel of the V2X system and (ii) obtain the corresponding noise metric for each channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3B illustrates an example noise scan of a V2X system according to the present disclosure.

FIG. 4 illustrates a plurality of noise regions of an example roadway system according to the present disclosure.

FIG. 5 illustrates a plurality of noise contours of a noise region of a roadway system according to the present disclosure.

FIG. 9 is a flowchart illustrating a method for automatic movement of vehicle applications from noisy wireless channels to quieter channels according to the present disclosure.

FIG. 10 is a flowchart illustrating a method for updating a driving path of the vehicle to avoid detected noise regions and previously identified noise regions according to the present disclosure.

Corresponding reference numerals indicate corresponding parts throughout the several views of the drawings.

DETAILED DESCRIPTION

The present disclosure relates to noise measurement applications that operate concurrently and in the background with other V2X applications on a connected vehicle (CV) or an autonomous vehicle (AV). V2X communication systems are configured to detect, quantify, and record noise levels, thereby improving the safety and accuracy of V2X systems and their persistence and reliability while driving through noisy regions. Subsequently, CVs and AVs may report detected noise regions to a remote server, which may update a database that includes information corresponding to identified noise regions. Furthermore, CVs and AVs may execute applications using the information corresponding to the reported noise regions, such as generating an advisory of reduced system function due to the noise region, static and dynamic driver route planning, automated reporting of high noise regions to an entity, and vehicle application channel migration.

Example embodiments will now be described more fully with reference to the accompanying drawings.

Figure 1:
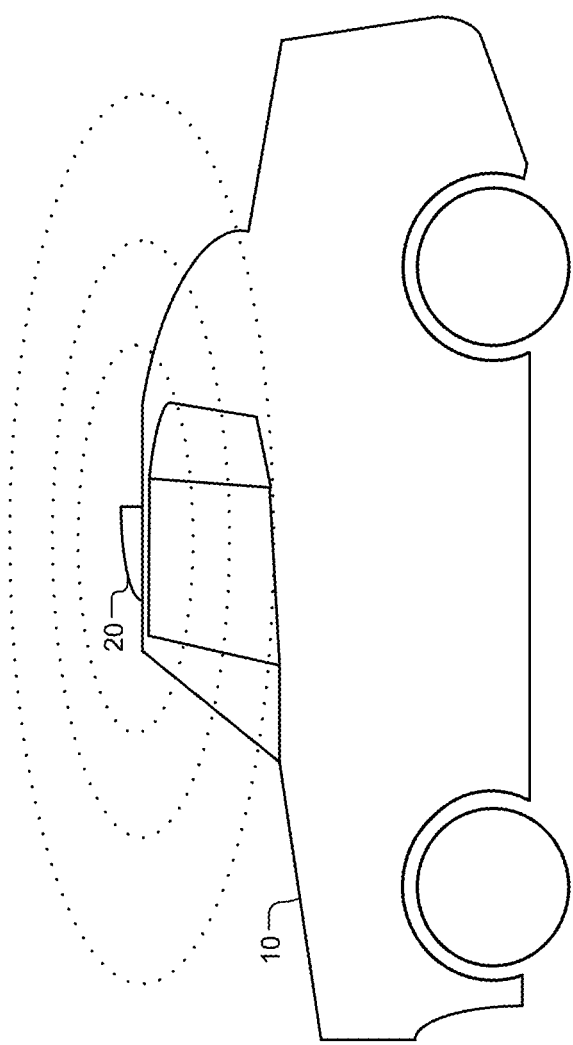
FIG. 1 illustrates a vehicle that is equipped with a vehicle-to-everything (V2X) system according to the present disclosure.

With reference to FIG. 1, a vehicle 10 that is equipped with a V2X system 20 is shown. The V2X system 20 is configured to deliver and receive early warnings of accidents or driving hazards between other vehicles 10 and infrastructures that are equipped with V2X systems 20 and pedestrians carrying devices that are equipped with V2X systems 20. Furthermore, the V2X system 20 is configured to detect, quantify, and record noise, as described below in further detail with reference to FIG. 3. In one embodiment, the V2X system 20 may include a DSRC system that communicates with other vehicles 10 and/or infrastructures equipped with the DSRC system by using a 75 MHz band around a 5.9 GHz frequency. Additionally or alternatively, the V2X system 20 may include a cellular vehicle-to-everything (C-V2X) communication system that communicates with other vehicles 10 and/or infrastructures equipped with the C-V2X system by using a 75 MHz band around a 5.9 GHz frequency. In other embodiments, the C-V2X system may communicate using other frequency bands and/or frequencies. All of the components of the V2X system 20 may be located at one or multiple locations on the roof or interior of the vehicle 10. In other embodiments, some of the components may be located in the interior of the vehicle 10.

Figure 2A:
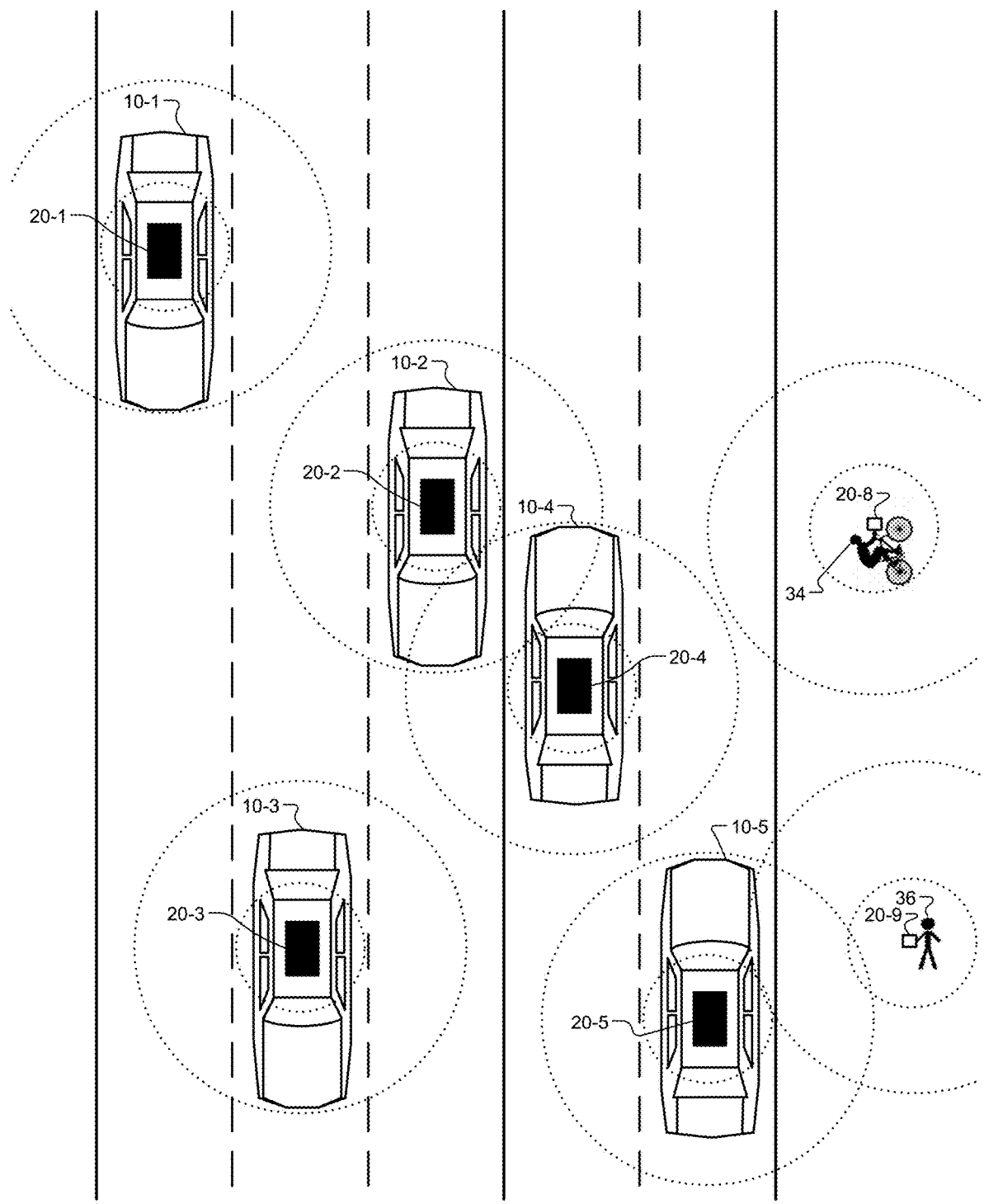
FIGS. 2A-2B illustrate communications in all directions among multiple vehicles equipped with V2X systems according to the present disclosure.

With reference to FIG. 2A, vehicles 10-1, 10-2, . . . 10-5 (collectively referred to as vehicles 10), a bicyclist 34, and a pedestrian 36, that are respectively equipped with V2X systems 20-1, 20-2, . . . 20-5, 20-8, 20-9 (collectively referred to as V2X systems 20) are shown. The V2X systems 20 may operate in both line-of-sight (LOS) and non-line-of-sight (NLOS) conditions, thereby allowing the V2X systems 20 of the vehicles 10 to communicate warnings, driving hazards, and noise measurements even with blockage from intervening vehicles, blind corners, or other roadside infrastructure. Wireless signals from each of the V2X systems 20 are illustrated radiating outward in a circular pattern, as indicated by the dotted circles in FIG. 2A. However, in other embodiments, the V2X systems 20 may have some weak spots or holes in coverage due to the difficulty of 5.9 GHz coverage.

Figure 2B:
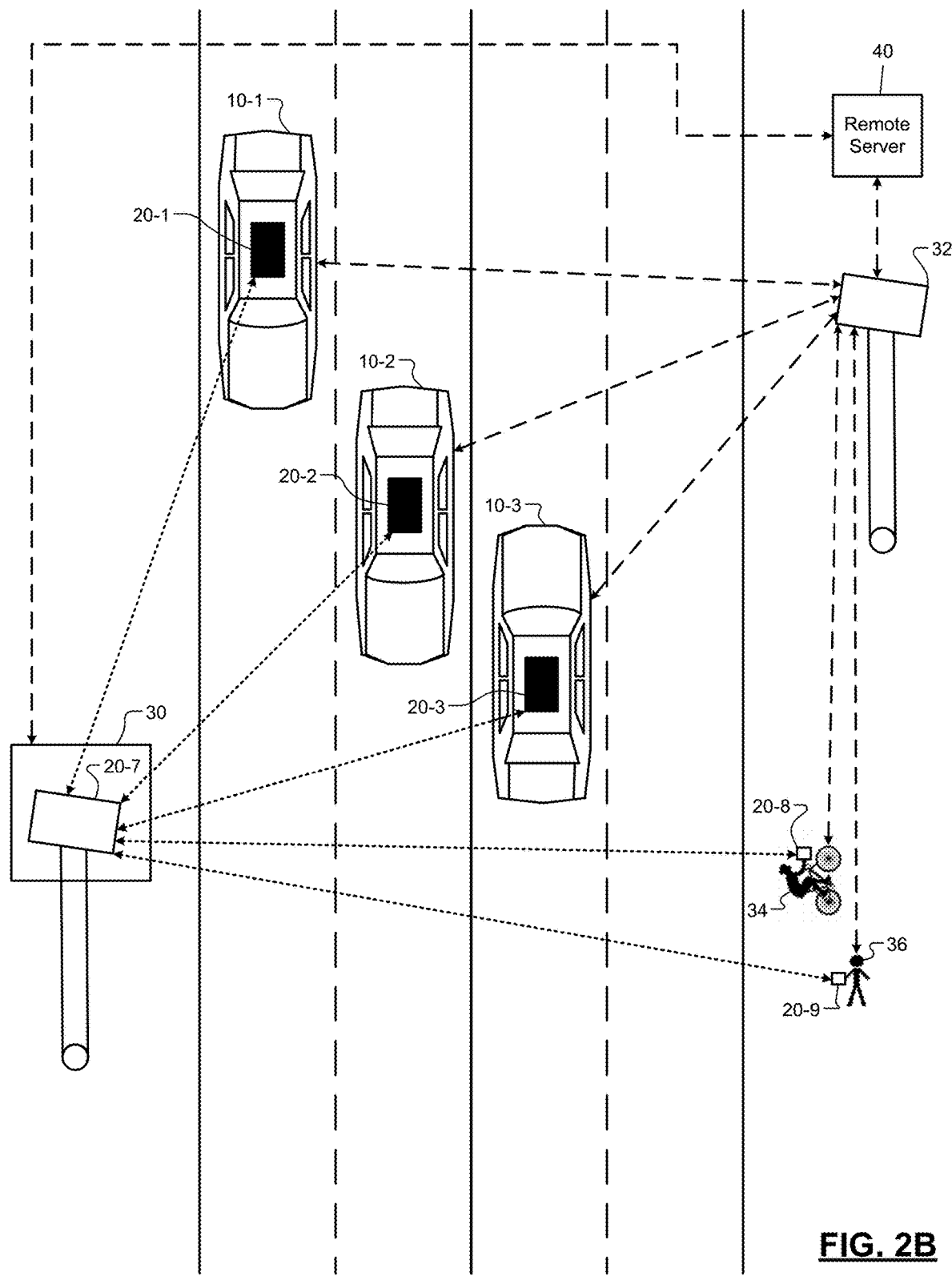

With reference to FIG. 2B, vehicles 10, cyclist 34, and pedestrian 36 are respectively equipped with V2X systems 20. This embodiment is similar to the embodiment disclosed above with reference to FIG. 2A, but this embodiment also includes a V2X roadside unit (V2X RSU) 30, a wireless base station 32, and a remote server 40. The V2X RSU 30 may be implemented by a variety of structures, traffic signs, and traffic signals, such as a stop sign, a traffic light, and various elevated communication structures. The V2X RSU 30 includes a respective V2X system 20-7, which is configured to deliver and receive early warnings of accidents or driving hazards between other vehicles, infrastructures, bicyclists, and/or pedestrians that are equipped with V2X systems 20. As an example, V2X system 20-7 is configured to deliver and receive early warnings of accidents or driving hazards between V2X systems 20-1, 20-2, 20-3 of vehicles 10-1, 10-2, 10-3, respectively, V2X system 20-8 associated with the bicyclist 34, and V2X system 20-9 associated with the pedestrian 36, as indicated by the dotted lines in FIG. 2B. In other embodiments, the vehicles 10, the bicyclist 34, and the pedestrian 36 may be configured to directly deliver and receive early warnings of accidents or driving hazards using the respective V2X systems 20 (not shown).

Furthermore, the V2X system 20-7 is configured to detect, quantify, and record noise. In response to detecting, quantifying, and/or recording noise, the V2X RSU 30 is configured to transmit signals corresponding to the detected, quantified, and/or recorded noise measurements to the remote server 40, as indicated by the dashed line connecting the V2X RSU 30 and the remote server 40. The V2X RSU 30 may transmit signals to the remote server 40 using, for example, an LTE/cellular signal, satellite signal, Wi-Fi signal, or other suitable telemetric communication link. Alternatively, the communication link may be implemented by any suitable hardwire link, such as an optical fiber link.

Additionally, the V2X system 20-7 of the V2X RSU 30 may be configured to receive the detected, quantified, and/or recorded noise measurements from V2X systems 20-1, 20-2, 20-3, 20-8. In response to receiving the detected, quantified, and/or recorded noise measurements from V2X systems 20-1, 20-2, 20-3, 20-8, the V2X RSU 30 is configured to transmit signals corresponding to the detected, quantified, and/or recorded noise measurements to the remote server 40.

Alternatively, the vehicles 10-1, 10-2, 10-3, the bicyclist 34, and the pedestrian 36 may transmit the detected, quantified, and/or recorded noise measurements to the wireless base station 32, as indicated by the dashed lines in FIG. 2B. The vehicles 10-1, 10-2, 10-3, may transmit the signals to the wireless base station 32 using, for example, a wireless transceiver system of the vehicles 10, as described below in further detail with reference to FIG. 3A. Likewise, the bicyclist 34 and the pedestrian 36 may transmit the signals to the wireless base station 32 using a wireless transceiver system (not shown).

The wireless base station 32 may be implemented by a cellular tower or other structure that is configured to receive signals transmitted by wireless transceiver systems. In response to receiving signals corresponding to the detected, quantified, and/or recorded noise measurements from the vehicles 10-1, 10-2, 10-3, the bicyclist 34, and/or the pedestrian 36, the wireless base station 32 is configured to transmit the signals corresponding to the detected, quantified, and/or recorded noise measurements to the remote server 40, as indicated by the dashed line connecting the wireless base station 32 and the remote server 40. The wireless base station 32 may transmit signals to the remote server 40 using, for example, an LTE/cellular signal, a satellite signal, a Wi-Fi signal, or other suitable telemetric communication link.

The remote server 40, which may include at least one processor that is configured to execute instructions stored in a nontransitory computer-readable medium, such as a random-access memory (RAM) and/or a read-only memory (ROM), may generate an entry that is stored in a database. The entry may include information corresponding to the detected, quantified, and/or recorded noise measurements. The remote server 40 may also be configured to execute various algorithms based on a plurality of entries in the database, such as generating an advisory of reduced system function resulting from previously identified noise regions, static and dynamic driver route planning, and automated reporting of high noise regions to an entity. In response to executing the various algorithms, the remote server 40 may transmit signals based on an output of the various algorithms to at least one of the V2X RSU 30 and the wireless base station 32 for subsequent transmission to the vehicles 10-1, 10-2, 10-3, the bicyclist 34, and the pedestrian 36.

Figure 3A:
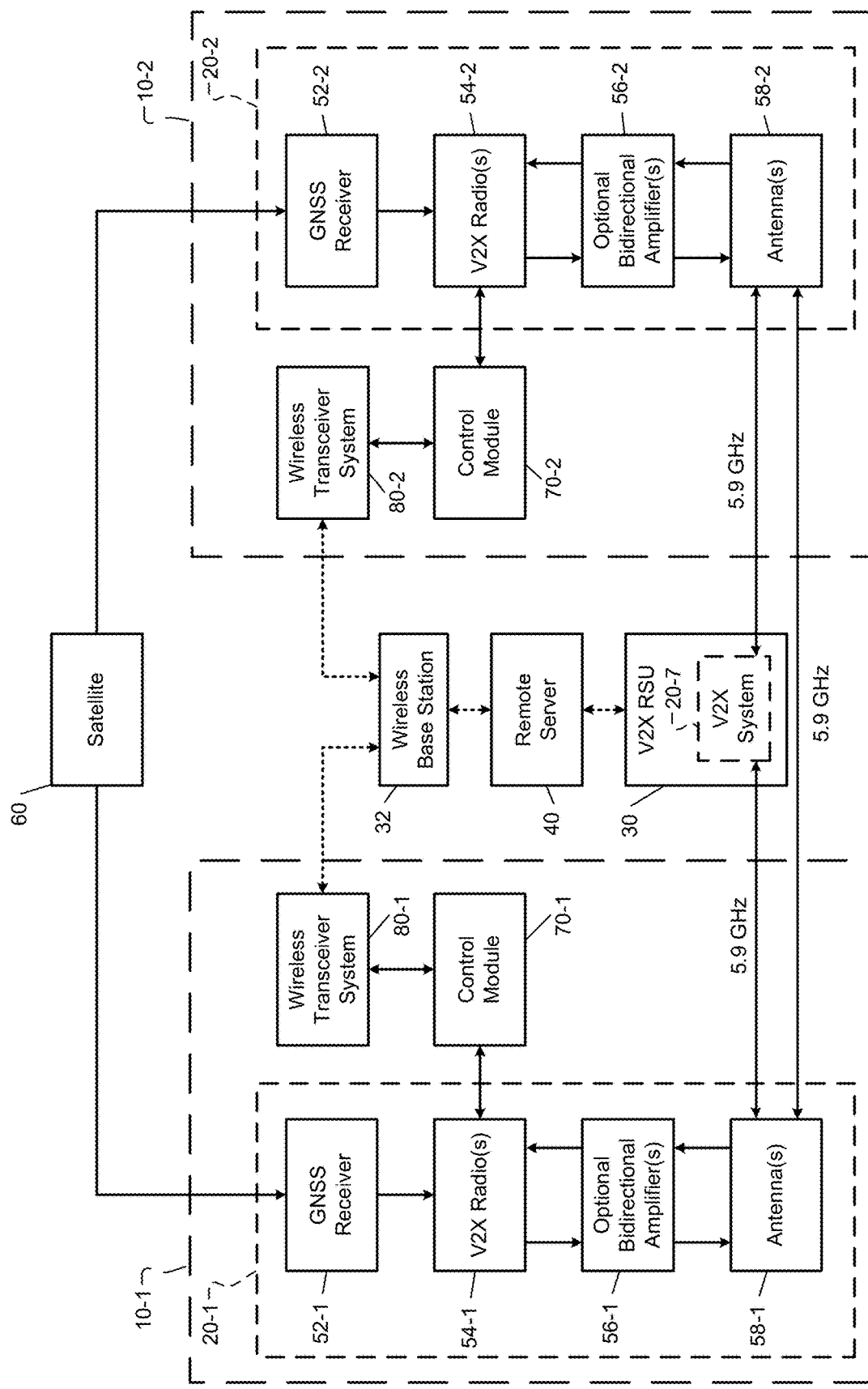
FIG. 3A illustrates an example embodiment of a V2X system according to the present disclosure.

With reference to FIG. 3A, an example embodiment of vehicles 10-1 and 10-2 and respective V2X systems 20-1 and 20-2 is shown. The V2X systems 20-1 and 20-2 include, respectively, Global Navigation Satellite System (GNSS) receivers 52-1 and 52-2 (collectively referred to as GNSS receivers 52), V2X radio(s) 54-1 and 54-2 (collectively referred to as V2X radio(s) 54), optional bidirectional amplifier(s) 56-1 and 56-2 (collectively referred to as optional bidirectional amplifier(s) 56), and antenna(s) 58-1 and 58-2 (collectively referred to as antenna(s) 58). The GNSS receivers 52 receive positioning and time information from a GNSS satellite 60. As an example, the GNSS receivers 52 and the GNSS satellite 60 may be a GPS receiver and GPS satellite, respectively. The V2X radio(s) 54 subsequently transmit signals representing position and/or time data from the GNSS receiver 52 in basic safety messages (BSMs) through the antenna(s) 58. The optional bidirectional amplifier(s) 56, electrically coupled between the V2X radio(s) 54 and the antenna(s) 58 via a low-loss RF cable, may increase the range of the signal generated by the V2X radio(s) 54 and may also increase the lower boundary of signal strength detectable by the antenna(s) 58. The antenna(s) 58 may also receive signals from other V2X systems 20. The antenna(s) 58 may include at least one antenna that may be placed at various locations on the vehicle 10.

Furthermore, the V2X systems 20 are configured to detect, quantify, and record noise measurements. In one embodiment, the V2X radio(s) 54 are configured to provide a signal to respective control modules 70 (e.g., an electronic control unit) based on signals indicative of noise that are received by the respective antenna(s) 58 and amplified by the respective optional bidirectional amplifier(s) 56. As an example, the V2X radio(s) 54, which may be implemented by a DSRC radio or a C-V2X radio, may generate a measurement signal representing a raw noise measurement on each channel of the respective V2X systems 20 (e.g., CH. 172, 174, 176, 178, 180, 182, and 184), as illustrated in graphic 85 shown in FIG. 3B. The raw noise measurements may be acquired when other CVs and AVs are nearby or when no CVs and AVs are near the vehicle 10.

The control modules 70, which include one or more processors configured to execute instructions stored in a nontransitory computer-readable medium, may subsequently determine a noise value of each channel based on the measurement signal. If the noise value of at least one channel exceeds a threshold noise value, the control modules 70 may determine that the respective vehicle 10 is near or within a noise region and subsequently execute, for example, a vehicle application channel migration algorithm, as described below in further detail. Moreover, if the noise measurements are acquired when other AVs or CVs are near the vehicle 10, the control module 70 is configured to generate and transmit the reporting signal indicating the noise measurement of the corresponding channel is being artificially driven high by external noise.

Furthermore, in response to determining the noise value of each channel, the control module 70 may instruct the respective V2X system 20 to transmit a reporting signal representing the noise value of each channel to V2X system 20-7 of the V2X RSU 30 for subsequent transmission to the remote server 40. Alternatively, the control module 70 may instruct a respective wireless transceiver system 80 to transmit the reporting signal representing the noise value of each channel to the wireless base station 32 for subsequent transmission to the remote server 40. The reporting signal may also include information corresponding to a location of the noise region (e.g., GPS coordinates), a geographic size of the noise region, noise susceptibility of corresponding vehicle functions/applications, a time duration of limited system function, a communication channel, and a timestamp. Based on the reporting signal, the remote server 40 configured to generate a corresponding entry that is stored in a database. Furthermore, if the respective vehicle 10 is near or within a noise region, the vehicle 10 or a remote server 40 may generate and transmit an advisory of reduced system function to the vehicle 10 and/or an updated route to the vehicle 10. The remote server 40 may update a database associated with a noise region map and report the noise region to an entity, as described below in further detail.

Additionally or alternatively, in order to detect, quantify, and record noise measurements, the V2X systems 20 may be configured to measure an amount of noise on each of the seven channels in order to determine whether the corresponding channels are busy. If at least one of the channels includes a noise value that indicates the corresponding channel is busy with over-the-air V2X data traffic, the control module 70 is configured to generate and transmit the reporting signal indicating that the respective vehicle 10 is near or within a noise region.

Additionally or alternatively, in order to detect and quantify noise measurements, the V2X systems 20 may be configured to determine a packet error rate (PER) of at least one communication channel of the respective V2X systems 20. The PER may be defined as a value that represents a number of unexpected non-receipt of messages from nearby vehicles 10. As an example, the PER may be calculated as a ratio between the number of unexpected non-receipt of messages and the number of expected received messages. If at least one of the communication channels has a PER that is greater than a threshold PER value (e.g., 10%), and the V2X link is considered strong enough to be operating nearly error-free, then the control module 70 is configured to generate and transmit the reporting signal indicating that the respective vehicle 10 suspects that it is near or within a noise region.

Additionally or alternatively, in order to detect and quantify noise measurements, the V2X systems 20 may be configured to determine a signal-to-noise ratio (SNR) of the surrounding environment. The SNR may be defined as a ratio of signal power to noise power. As an example, if the V2X system 20 detects a sudden reduction of the SNR of at least one of the communication channels, the control module 70 is configured to generate and transmit the reporting signal indicating that the respective vehicle 10 is near or within a noise region.

Additionally or alternatively, in order to detect and quantify noise, the V2X systems 20 may be configured to compare an arrival time of incoming messages to an expected arrival time of the incoming messages. In one embodiment, the presence of noise may cause messages to arrive at a time later than the expected arrival time. As an example, if a difference between the arrival time and the expected arrival time of the incoming messages exceeds a threshold difference, the control module 70 is configured to generate and transmit the reporting signal indicating that the respective vehicle 10 may be near or within a noise region.

The electronic control modules 70 may also be configured to communicate information to a vehicle operator (not shown) based on the received positioning and/or time data. In various implementations, the electronic control modules 70 may also be configured to a hazard or safety alert to another vehicle. As an example, in response to a hazard communicated via the V2X system 20-1, the electronic control module 70-1 may be configured to alert the vehicle operator of the hazard and instruct the vehicle operator to decelerate, change lanes, or take other safety precautions.

With reference to FIG. 4, a plurality of noise regions 90-1, 90-2, . . . 90-5 (collectively referred to as noise regions 90), which are illustrated as topographical dotted lines, on an example roadway system is shown. As described above, the vehicles 10-1, 10-2, . . . 10-5 (collectively referred to as vehicles 10) are configured to detect and quantify noise using the respective V2X systems 20 and control modules 70 (not shown).

The vehicles 10 may transmit, using the V2X system 20 or the wireless transceiver system 80 (not shown), a reporting signal to the remote server 40 (not shown) via the V2X RSU 30 (not shown) or the wireless base station 32 (not shown). As a specific example, vehicle 10-2 may transmit a reporting signal to the remote server 40 while traveling in noise region 90-2; vehicle 10-1 may transmit a reporting signal to the remote server 40 while traveling near noise region 90-1; and vehicle 10-4 may transmit a first reporting signal corresponding to noise region 90-3 and a second reporting signal corresponding to noise region 90-2. Additionally or alternatively, the control modules 70 of the vehicles 10 may temporarily store the data corresponding to the logged noise events and subsequently instruct the V2X system 20 or the wireless transceiver system 80 to transmit the reporting signal when the vehicle 10 passes by or travels near the V2X RSU 30 or the wireless base station 32.

In response to the remote server 40 receiving the reporting signals, the remote server 40 is configured to generate, using the one or more processors, an entry based on the reporting signal. Subsequently, the entry may be stored in a database of the remote server 40. Based on a plurality of entries in the database, one or more processors of the remote server 40 may be configured to generate a table and/or graphic representation of various noise regions of the roadway system. As an example, the remote server 40 may be configured to generate a noise map that is displayed on a user interface in communication with the remote server 40. Moreover, the noise map may include visual indicators at various locations the presence of noise. The visual indicators may be dynamic, or in other words, the map may represent locations that are currently detecting noise. Alternatively, the visual indicators of the map may be static, or in other words, the map may represent locations that detect noise consistently over time, space, channel, and power level.

Additionally, the plurality of entries of the database may be referenced when, for example, the vehicle 10 generates advisories of reduced system functions in the noise region 90 and transmits information to a remote mapping application that is configured to provide static and dynamic driver route planning to the operator of the vehicle 10.

With reference to FIG. 5, a plurality of noise contours 95-1, 95-2, . . . 95-6 (collectively referred to as noise contours 95), which are represented by topographic dotted lines, within a noise region 90 is shown. In general, this topographic map of noise is characterized by increasing noise powers from 95-1 to 95-6. In a more sophisticated sense, as described herein, each of the noise contours 95 is associated with an upper and/or lower signal strength limit of noise values within the noise region 90. As an example, noise contour 95-1 may represent a lower limit of a first range of noise values of the noise region 90, and noise contour 95-2 may represent an upper limit of the first range of noise values of the noise region 90; the noise contour 95-2 may represent a lower limit of a second range of noise values of the noise region 90, and noise contour 95-3 may represent an upper limit of the second range of noise values of the noise region 90; etc. The signal strength may be represented by any suitable metric indicative of signal strength, such as a power ratio in decibels of the message (dBm), a power spectral density of the message (dBm/MHz), a packet error rate (PER) a signal-to-noise ratio (SNR), etc.

The one or more processors of the control modules 70 (not shown) and/or remote server 40 (not shown) may be configured to determine a source of the noise based on the noise contours 95. In one embodiment, the one or more processors may be configured to identify a peak noise area of the noise region 90 based on the noise contours 95. As an example, the one or more processors may determine that the peak noise area of the noise region 90 is located within an area of contour 95-6. Accordingly, the one or more processors may determine that a device located within or on building 100 is generating the noise.

In some embodiments, if a noise value of the noise region 90 is above a critical threshold value, the remote server 40 may be configured to alert an entity (e.g., Federal Communications Commission) for further investigation of the noise region 90, illegal interference assessment of the noise region 90, and noise mitigation of the noise region 90, as described below in further detail with reference to FIG. 8.

Figure 6:
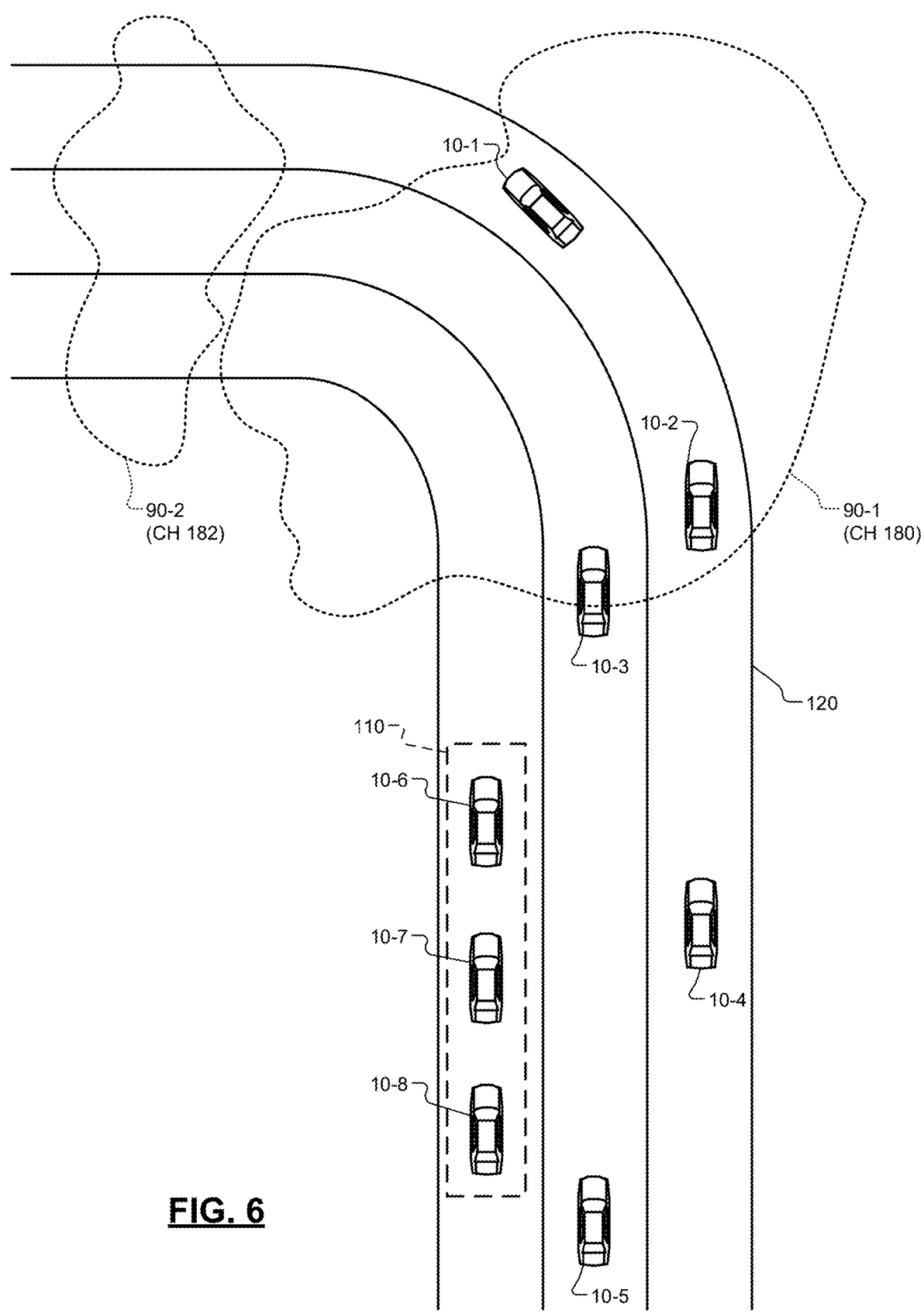
FIG. 6 illustrates a vehicle platoon approaching a noise region and migrating to a quieter communication channel in response to detecting the noise region according to the present disclosure.

With reference to FIG. 6, an example roadway system with a V2X-equipped vehicle platoon 110 is shown. The roadway system includes vehicles 10-1, 10-2, . . . 10-8, the noise regions 90-1, 90-2 (collectively referred to as noise regions 90), the vehicle platoon 110, and road 120. Vehicles 10-6, 10-7, 10-8 of the vehicle platoon 110 may be CVs and/or AVs that are configured to execute vehicle platooning functions, which may be defined as functions that increase a capacity and efficiency of road transportation by grouping vehicles on a road and controlling the operations of the vehicles 10-6, 10-7, 10-8 as a group. As an example, each vehicle 10-6, 10-7, 10-8 of the vehicle platoon 110 may be configured to accelerate and/or brake simultaneously, thereby allowing for a closer headway between vehicles 10-6, 10-7, 10-8 and eliminating a reacting distance needed for human reaction. Furthermore, vehicle platooning functions may provide greater fuel economy, reduced congestion, shorter commutes, and fewer traffic collisions.

In order to execute the vehicle platooning functions, each vehicle 10-6, 10-7, 10-8 of the vehicle platoon 110 may be configured to share sensor measurements and other relevant information via a first communication channel of the respective V2X systems 20 (not shown). Furthermore, each vehicle 10-6, 10-7, 10-8 of the vehicle platoon 110 is configured to detect and quantify noise levels of each communication channel using the respective V2X systems 20. In response to the first communication channel having a noise measurement above a threshold value, each vehicle 10-6, 10-7, 10-8 of the vehicle platoon 110 may migrate to a second, less noisy communication channel in order to share sensor measurements and other relevant information.

As an example, each vehicle 10-6, 10-7, 10-8 of the vehicle platoon 110 may detect noise region 90-1 on a first communication channel (e.g., CH 180) and noise region 90-2 on a second communication channel (e.g., CH 182). Accordingly, sensor measurements and other relevant information that are originally communicated via the first or second communication channel may subsequently be communicated via a quieter, less noisy third communication channel (e.g., CH 176) in order to maintain the vehicle platoon 110 and to continue accurately sharing sensor measurements and other relevant information necessary for executing various vehicle platooning functions.

While the above embodiment describes the channel migration algorithm in the context of the vehicle platooning functions, it should be understood that the channel migration algorithm may be executed for various other applications and functions of the vehicles 10.

Figure 7:
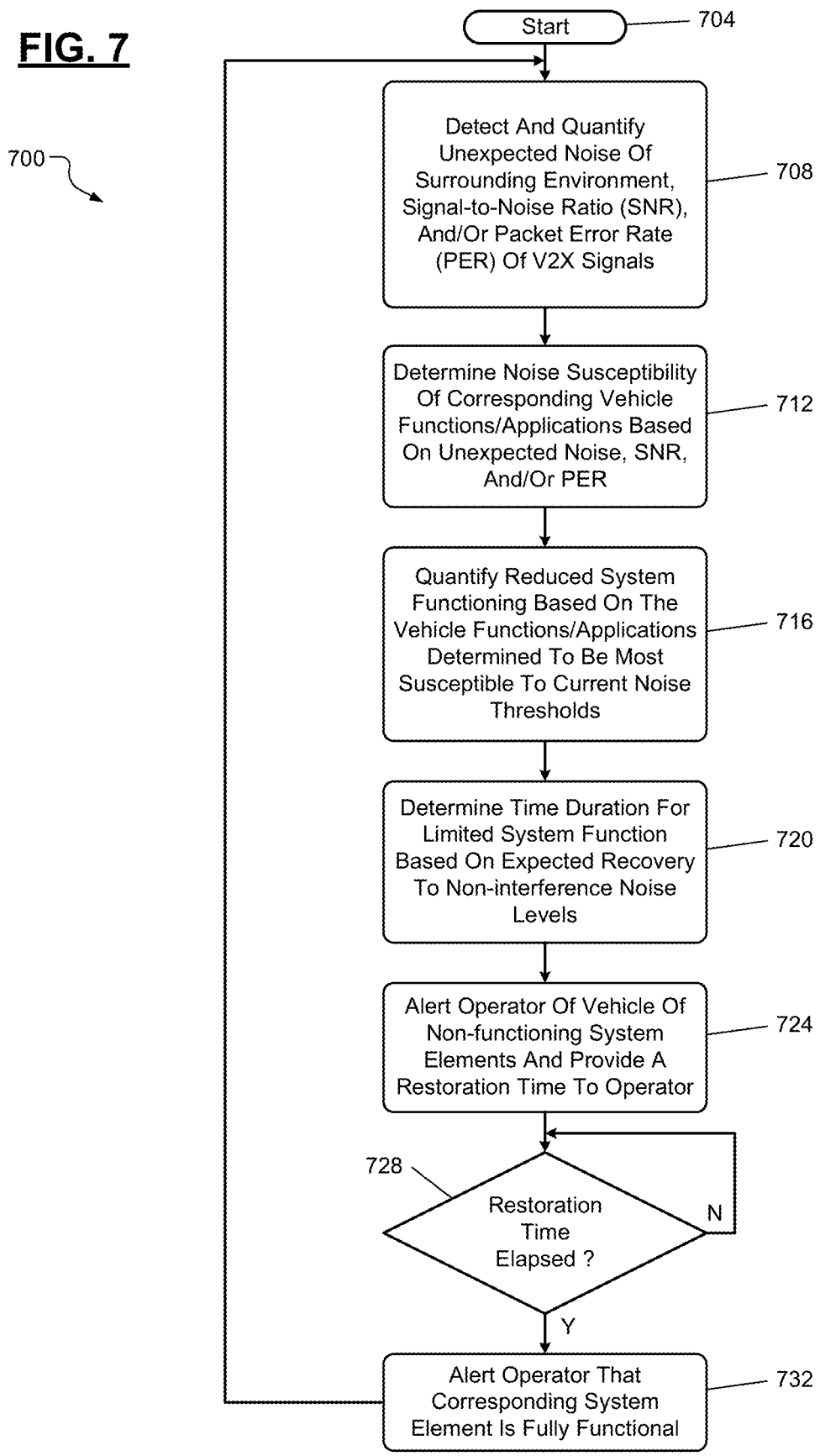
FIG. 7 is a flowchart illustrating a method for detecting a noise region and generating driver advisories according to the present disclosure.

With reference to FIG. 7, a flowchart illustrating a control algorithm 700 for detecting a noise region and generating driver advisories is shown. The control algorithm 700 begins at 704 when, for example, an operator turns on the vehicle 10. At 708, the control algorithm 700 detects and quantifies, using the V2X system 20 and the control module 70, unexpected noise of the surrounding environment, and an SNR, and/or a PER of V2X signals, if present. At 712, the control algorithm 700 determines, using the control module 70, a noise susceptibility of the corresponding vehicle functions or applications based on the unexpected noise, SNR, and/or PER. As an example, the control module 70 may determine that certain vehicle functions or applications, such as non-line-of-sight (NLOS) imminent crash safety functions and NLOS AV sensor sharing applications for executing hazard detection functions. Further, the control module 70 may determine that other vehicle functions or applications are not highly susceptible to noise, such as short-distance line-of-sight AV sensor sharing applications for executing object detection functions and some short distance line-of-sight (LOS) applications, such as a blind spot warning application.

At 716, the control algorithm 700 quantifies, using the control module 70, a reduced system functioning based on the vehicle functions or applications determined to be the most susceptible to current noise thresholds. As an example, the control module 70 may determine that imminent crash safety functions may be completely inhibited while the vehicle 10 is in the noise region 90. At 720, the control algorithm 700 determines, using the control module 70, a time duration for the limited system function based on an expected recovery to non-interference noise levels. As an example, the control module 70 may determine that imminent crash safety functions may be completely inhibited for fifteen seconds, which may correspond to the amount of time the vehicle 10 needs to exit the noise region 90. Furthermore, the control module 70 may make this determination based on location data obtained by the V2X system 20 and/or speed data obtained by other sensors of the vehicle 10.

At 724, the control algorithm 700 alerts, using the control module 70 and an instrument cluster or on-windshield display device of the vehicle 10, the operator of the vehicle 10 of the non-functioning system elements (e.g., alert the operator of the blind corner approach, left turn assist, or do not pass warning functions are temporarily impaired and alert the operator that the cooperative blind spot warning and forward warning collision functions are operating in spite of the noise, etc.) and provides a restoration time to the operator (e.g., the time duration). At 728, the control algorithm 700 determines, using the control module 70, whether the restoration time has elapsed. If so, the control algorithm 700 proceeds to 732; otherwise, the control algorithm 700 remains at 728 until the restoration time has elapsed. At 732, the control algorithm 700 alerts, using the control module 70 and the instrument cluster or other display device of the vehicle 10, the operator of the vehicle 10 that the corresponding system element is fully functional again and then proceeds to 708.

Figure 8:
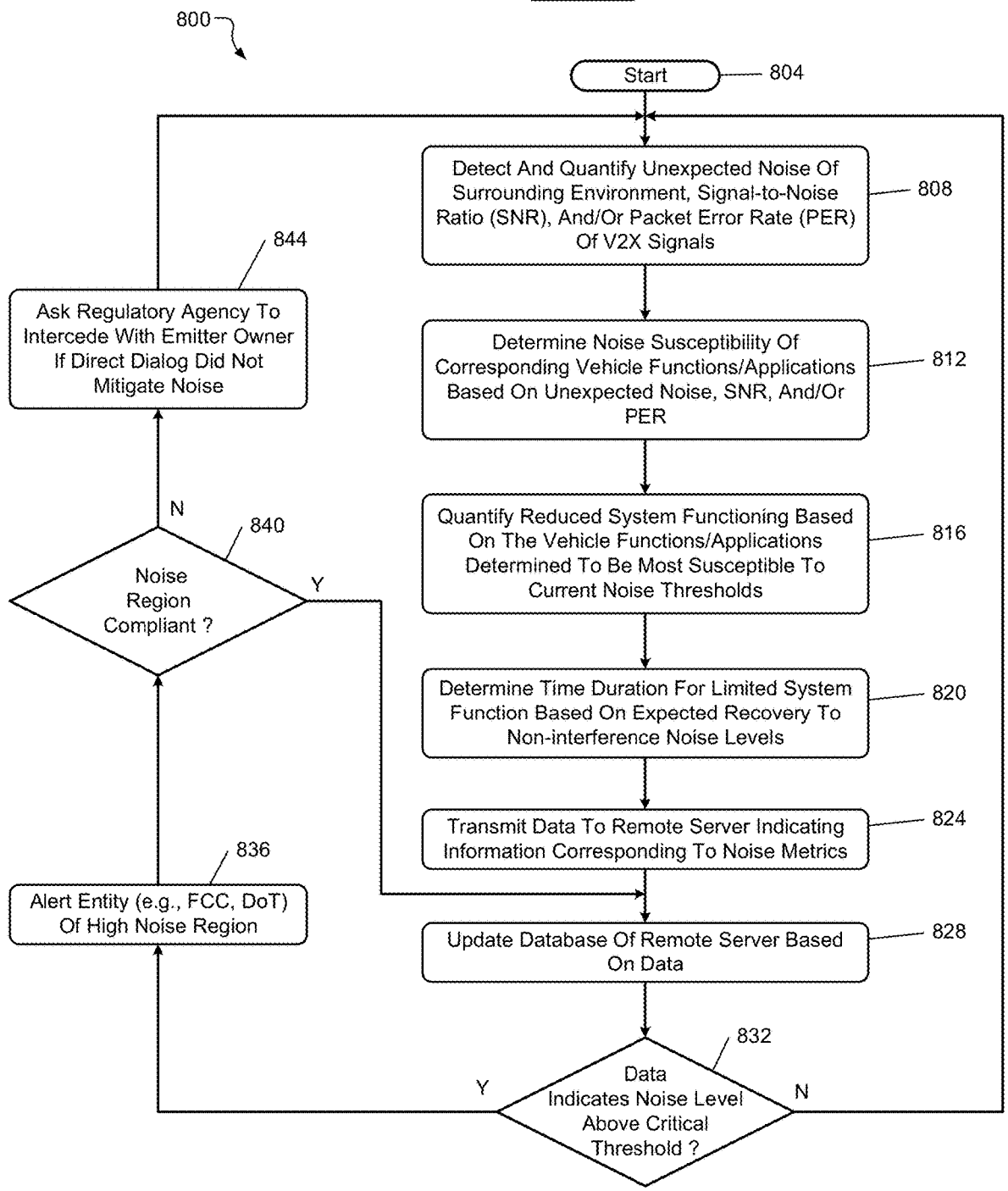
FIG. 8 is a flowchart illustrating a method for aggregating reported noise regions into a database of a remote server and automated reporting of high noise regions to an entity according to the present disclosure.

With reference to FIG. 8, a flowchart illustrating a control algorithm 800 for aggregating noise regions into a database of a remote server and automated reporting of high noise regions to an entity is shown. The control algorithm 800 begins at 804 when, for example, an operator turns on the vehicle 10. At 808, the control algorithm 800 detects and quantifies, using the V2X system 20 and the control module 70, unexpected noise of the surrounding environment, an SNR, and/or a PER of V2X signals. At 812, the control algorithm 800 determines, using the control module 70, a noise susceptibility of the corresponding vehicle functions or applications based on the unexpected noise, SNR, and/or PER. As an example, the control module 70 may determine that certain vehicle functions or applications, such as NLOS imminent crash safety functions, AV sensor sharing applications for executing hazard detection functions, and vehicle platoon functions, are highly susceptible to noise. Further, the control module 70 may determine that other vehicle functions or applications are not highly susceptible to noise, such as LOS AV sensor sharing applications for executing object detection functions.

At 816, the control algorithm 800 quantifies, using the control module 70, a reduced system functioning based on the vehicle functions or applications determined to be the most susceptible to current noise thresholds. As an example, the control module 70 may determine that imminent crash safety functions may be completely inhibited while the vehicle 10 is in the noise region 90. At 820, the control algorithm 800 determines, using the control module 70, a time duration for the limited system function based on an expected recovery to non-interference noise levels. As an example, the control module 70 may determine that NLOS imminent crash safety functions may be completely inhibited for fifteen seconds, which may correspond to the amount of time the vehicle 10 needs to exit the noise region 90. Furthermore, the control module 70 may make this determination based on location data obtained by the V2X system 20 and/or speed data obtained by other sensors of the vehicle 10.

At 824, the control algorithm 800 transmits, using the V2X system 20 or the C-V2X system 80, data to the remote server 40 via one of the V2X RSU 30 or the wireless base station 32, and the data indicates information corresponding to the noise metrics. At 828, the control algorithm 800 updates, using the remote server 40, a database of the remote server 40 based on the data. At 832, the control algorithm 800 determines, using the remote server 40, whether the data indicates the noise level is above a critical threshold. As an example, the critical threshold may be a value that indicates potential malicious and/or illegal signal transmissions that are interfering with communications of the V2X systems 20. If the data indicates that the noise value is above the critical threshold, the control algorithm 800 proceeds to 836; otherwise, the control algorithm proceeds to 808.

At 836, the control algorithm 800 alerts, using the V2X system 20 and/or the remote server 40, an entity (e.g., Federal Communications Commission, Department of Transportation) of the high noise region 90. At 840, the control algorithm 800 determines, using the V2X system 20, the remote server 40 and/or the entity, whether the noise region is compliant with a technical standard or legal standard. As an example, the noise region 90 may be compliant with a legal standard if the noise is being generated by, for example, a governmental agency with express or implied authority to generate and transmit the signals interfering with the V2X signals. If the noise region 90 is compliant, the control algorithm 800 proceeds to 828; otherwise, the control algorithm 800 proceeds to 844. At 844, the control algorithm 800 asks a regulatory agency to intercede with an emitter owner if direct dialog does not mitigate the noise and then proceeds to 808.

With reference to FIG. 9, a flowchart illustrating a control algorithm 900 for automatically moving vehicle applications from noisy channels to quieter channels is shown. The control algorithm 900 begins at 904 when, for example, an operator turns on the vehicle 10. At 908, the control algorithm 900 detects and quantifies, using the V2X system 20 and the control module 70, unexpected noise of the surrounding environment, an SNR, and/or a PER of V2X signals. Alternatively, the control algorithm 900 may reference, using the control module 70 and the remote server 40, entries in the database corresponding to previously identified or existing noise regions. At 912, the control algorithm 900 determines, using the control module 70, a noise susceptibility of the corresponding vehicle functions or applications based on the unexpected noise, SNR, PER, and/or plurality of entries. As an example, the control module 70 may determine that certain vehicle functions or applications, such as NLOS imminent crash safety functions, AV sensor sharing applications for executing hazard detection functions, and vehicle platoon functions, are highly susceptible to noise. Further, the control module 70 may determine that other vehicle functions or LOS applications are not highly susceptible to noise, such as AV sensor sharing applications for executing object detection functions.

At 916, the control algorithm 900 determines, using the V2X system 20 and/or the control module 70, whether there are other quieter communication channels that are available to execute and continue the application session. As an example, if the V2X system 20 includes the DSRC system; the application session is being executed on CH 176 of the DSRC system; and channel 176 is noisy, the V2X system 20 and/or control module 70 may identify other less noisy channels. If one of the less noisy channels is available for executing the application session, the control algorithm 900 proceeds to 918. If there are no other less noisy and available channels for executing the application session, the control algorithm 900 proceeds to 924. At 918, the control algorithm 900 determines whether a first V2X radio is unable to migrate to another channel. If so, the control algorithm 900 proceeds to 919; otherwise, the control algorithm 900 proceeds to 920. At 919, the control algorithm 900 determines whether a second V2X radio is available. If so, the control algorithm 900 proceeds to 920; otherwise, the control algorithm 900 proceeds to 924. At 920, the control algorithm 800 migrates to a quieter communication channel and then proceeds to 908.

At 924, the control algorithm 900 quantifies, using the control module 70, a reduced system functioning based on the vehicle functions or applications determined to be the most susceptible to current noise thresholds. As an example, the control module 70 may determine that imminent crash safety functions may be completely inhibited while the vehicle 10 is in the noise region 90. At 928, the control algorithm 900 determines, using the control module 70, a time duration for the limited system function based on an expected recovery to non-interference noise levels. As an example, the control module 70 may determine that imminent crash safety functions may be completely inhibited for fifteen seconds, which may correspond to the amount of time the vehicle 10 needs to exit the noise region 90. Furthermore, the control module 70 may make this determination based on location data obtained by the V2X system 20 and/or speed data obtained by other sensors of the vehicle 10.

At 932, the control algorithm 900 alerts, using the control module 70 and an instrument cluster or other display device of the vehicle 10, the operator of the vehicle 10 of the non-functioning system elements (e.g., alert the operator of the blind corner approach, left turn assist, or do not pass warning functions are temporarily impaired and alert the operator that the cooperative blind spot warning and forward warning collision functions are operating in spite of the noise, etc.) and provides a restoration time to the operator (e.g., the time duration). At 936, the control algorithm 900 determines, using the control module 70, whether the restoration time has elapsed. If so, the control algorithm 900 proceeds to 940; otherwise, the control algorithm 900 remains at 936 until the restoration time has elapsed. At 940, the control algorithm 900 alerts, using the control module 70 and the instrument cluster or other display device of the vehicle 10, the operator of the vehicle 10 that the corresponding system element is fully functional and then proceeds to 908.

With reference to FIG. 10, a flowchart illustrating a control algorithm 1000 for updating a driving path of the vehicle 10 based on detected noise regions and previously identified noise regions is shown. The control algorithm 1000 begins at 1004 when, for example, an operator turns on the vehicle 10 and has initiated a navigation application of the vehicle 10 or in communication with the vehicle 10 (e.g., a navigation application executed on a mobile device, such as a smartphone, or control module 70). At 1008, an operator inputs destination information into an interface of the navigation application. As an example, the destination information may include a name of the destination and/or an address of the destination. At 1012, the control algorithm 1000 determines and displays, using the navigation application, a recommended path based on, for example, a shortest distance or driving time between the operator's location and the inputted destination. Additionally or alternatively, the recommended path may be configured to avoid previously identified noise regions indicated by the plurality of entries in the database. At 1016, the control algorithm 1000 detects and quantifies, using the V2X system 20 and the control module 70, unexpected noise of the surrounding environment, an SNR, and/or a PER of V2X signals.

At 1020, the control algorithm 1000 determines, using the V2X system 20 and/or the control module 70 of the vehicle 10 or another vehicle equipped with the V2X system 20 that has recently traveled through or near the region of interest along the path, whether a new noise region 90 is detected along the path of the vehicle 10. If so, the control algorithm 1000 proceeds to 1032; otherwise, the control algorithm 1000 proceeds to 1024. At 1032, the control algorithm 1000 updates the database with an entry based on the new noise region and then proceeds to 1034. At 1034, the control algorithm 1000 determines and displays, using the navigation application, a new path to avoid the noise region 90 and proceeds to 1028. Alternately, if the vehicle 10 has a second onboard V2X radio, it may move to a quieter channel while the first radio remains on the current channel, whatever its noise state. At 1024, the control algorithm 1000 determines, using the control module 70 and the remote server 40, whether an entry in the database indicates a noise region along the path. If so, the control algorithm 1000 proceeds to 1032; otherwise, the control algorithm 1000 proceeds to 1028. At 1028, the control algorithm 1000 determines, using the navigation application, whether the vehicle 10 has arrived at the destination. If so, the control algorithm 1000 proceeds to 1036; otherwise, the control algorithm 1000 proceeds to 1016. At 1036, the control algorithm 1000 ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
receiving, using at least one processor that is configured to execute instructions stored in a nontransitory computer-readable medium, a first reporting signal from a vehicle-to-everything (V2X) communication system, wherein the first reporting signal includes data indicating (i) a noise measurement of a communication channel, and (ii) a location associated with the noise measurement, the noise measurement being based on at least one of a packet error rate of the communication channel, a signal-to-noise ratio of the communication channel, and an arrival time of an incoming message on the communication channel;
determining, using the at least one processor, the location is associated with a noisy region in response to a value of the noise measurement exceeding a first threshold value;
generating, using the at least one processor, an entry based on the first reporting signal in response to the value of the noise measurement exceeding the first threshold value;
storing, using the at least one processor, the entry in a database, wherein:
the database includes a plurality of additional entries; and
each of the plurality of additional entries includes information based on a plurality of additional reporting signals; and
generating, using the at least one processor, an alert based on at least one of the entry and the plurality of additional entries, wherein the alert is configured to indicate a presence of noise at a location associated with the at least one of the entry and the plurality of additional entries.

2. The method of claim 1, further comprising transmitting, using the at least one processor, a signal to the V2X communication system, wherein the signal is configured to cause a control module of a vehicle associated with the V2X communication system to indicate to an operator that at least one vehicle function of the vehicle is impaired.

3. The method of claim 2, wherein the signal is configured to cause the control module to generate a restoration time of the at least one vehicle function of the vehicle.

4. The method of claim 1, further comprising transmitting, using the at least one processor, a signal to at least one the V2X communication system of a vehicle and a mobile device, wherein the signal is configured to cause at least one of a control module of the vehicle and the mobile device to update a navigation application.

5. The method of claim 4, wherein updating the navigation application further comprises:
identifying a recommended path generated by the navigation application;
determining whether the recommended path is associated with at least one of the plurality of additional entries;
generating a new path in response to the recommended path being associated with at least one of the plurality of additional entries; and
displaying the new path on an interface of the navigation application in response to generating the new path.

6. The method of claim 4, wherein updating the navigation application further comprises:
identifying a recommended path generated by the navigation application;
determining whether the recommended path is associated with the entry;
generating a new path in response to the recommended path being associated with the entry; and
displaying the new path on an interface of the navigation application in response to generating the new path.

7. The method of claim 1, further comprising transmitting a critical report to an entity in response to the value of the noise measurement of the communication channel of the first reporting signal exceeding a critical threshold value.

8. The method of claim 1, further comprising:
generating, using the at least one processor, a plurality of noise contours based on at least one of the entry and a set of the plurality of additional entries; and identifying, using the at least one processor, a physical location for a source of noise based on the plurality of noise contours.

9. A system comprising:
at least one processor that is configured to execute instructions stored in a nontransitory computer-readable medium, wherein the instructions include:
receiving a first reporting signal from a vehicle-to-everything (V2X) communication system, wherein the first reporting signal includes data indicating (i) a noise measurement of a communication channel, and (ii) a location associated with the noise measurement, the noise measurement being based on at least one of a packet error rate of the communication channel, a signal-to-noise ratio of the communication channel, and an arrival time of an incoming message on the communication channel;
determining the location is associated with a noisy region in response to a value of the noise measurement exceeding a first threshold value;
generating an entry based on the first reporting signal in response to the value of the noise measurement exceeding the first threshold value;
storing the entry in a database, wherein:
the database includes a plurality of additional entries; and
each of the plurality of additional entries includes information based on a plurality of additional reporting signals; and
generating an alert based on at least one of the entry and the plurality of additional entries, wherein the alert is configured to indicate a presence of noise at a location associated with the at least one of the entry and the plurality of additional entries.

10. The system of claim 9, wherein the instructions further comprise transmitting a signal to the V2X communication system, wherein the signal is configured to cause a control module of a vehicle associated with the V2X communication system to indicate to an operator that at least one vehicle function of the vehicle is impaired.

11. The system of claim 10, wherein the signal is configured to cause the control module to generate a restoration time of the at least one vehicle function of the vehicle.

12. The system of claim 9, wherein the instructions further comprise transmitting a signal to at least one the V2X communication system of a vehicle and a mobile device, wherein the signal is configured to cause at least one of a control module of the vehicle and the mobile device to update a navigation application.

13. The system of claim 12, wherein updating the navigation application further comprises:
identifying a recommended path generated by the navigation application;
determining whether the recommended path is associated with at least one of the plurality of additional entries;
generating a new path in response to the recommended path being associated with at least one of the plurality of additional entries; and
displaying the new path on an interface of the navigation application in response to generating the new path.

14. The system of claim 12, wherein updating the navigation application further comprises:
identifying a recommended path generated by the navigation application;
determining whether the recommended path is associated with the entry;
generating a new path in response to the recommended path being associated with the entry; and
displaying the new path on an interface of the navigation application in response to generating the new path.

15. The system of claim 9, wherein the instructions further comprise transmitting a critical report to an entity in response to the value of the noise measurement of the communication channel of the first reporting signal exceeding a critical threshold value.

16. The system of claim 9, wherein the instructions further comprise:
generating a plurality of noise contours based on at least one of the entry and a set of the plurality of additional entries; and
identifying a physical location for a source of noise based on the plurality of noise contours.

17. A method comprising:
determining, using at least one processor that is configured to execute instructions stored in a nontransitory computer-readable medium, a first noise metric of a first signal received by a first vehicle-to-everything (V2X) communication system of a first vehicle, wherein:
the first signal is associated with a first location; and
the first signal is received using a first communication channel;
determining, using the at least one processor, whether the first noise metric exceeds a threshold value;
receiving, using the at least one processor, information corresponding to a second noise metric of a second signal received by a second V2X communication system of a second vehicle, wherein:
the second signal is associated with the first location; and
the second signal is received using the first communication channel;
selecting, using the at least one processor, a second communication channel in response to (i) the first noise metric exceeding the threshold value and (ii) the second noise metric exceeding the threshold value; and
in response to selecting the second communication channel, instructing, using the at least one processor, the first V2X communication system to establish a communication link with the second V2X communication system via the second communication channel;
wherein the first noise metric and the second noise metric are each based on at least one of a packet error rate of the first communication channel of the first V2X communication system, a signal-to-noise ratio of the first communication channel, and an arrival time of an incoming message on the first communication channel.

18. The method of claim 17, wherein noise metrics of additional signals received using the second communication channel are less than the threshold value.

19. The method of claim 17 further comprising:
scanning each channel of the V2X system and obtaining a corresponding noise metric for each channel as a background operation; and
transmitting the corresponding noise metric for each channel to a second vehicle that is not configured to (i) scan each channel of the V2X system and (ii) obtain the corresponding noise metric for each channel.

* * * * *

UNITED STATES PATENT AND TRADEMARK OFFICE
CERTIFICATE OF CORRECTION

PATENT NO. : 10,560,862 B1  
APPLICATION NO. : 16/038578  
DATED : February 11, 2020  
INVENTOR(S) : Gallagher Page 1 of 1

It is certified that error appears in the above-identified patent and that said Letters Patent is hereby corrected as shown below:

On the Title Page

At Column 1, item (22), Line 1, after "2018", insert:  
--¶(65) Prior Publication Data US 2020/0029233 A1 Jan. 23, 2020--

Signed and Sealed this  
Twenty-fourth Day of March, 2020

Andrei Iancu  
*Director of the United States Patent and Trademark Office*